United States Patent
Ikesue

(10) Patent No.: US 6,810,121 B1
(45) Date of Patent: Oct. 26, 2004

(54) COMMON PACKAGE

(75) Inventor: Shinji Ikesue, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/373,166

(22) Filed: Aug. 12, 1999

(30) Foreign Application Priority Data

Nov. 24, 1998 (JP) ............................................ 10-332665

(51) Int. Cl.⁷ .......................... H04M 1/00; H04M 9/00; H04M 3/00; H04M 7/00
(52) U.S. Cl. .................. 379/399.01; 379/244; 379/268; 379/333; 379/413.02
(58) Field of Search ................................ 379/9.01, 9.02, 379/156, 157, 165, 196, 197, 242, 244, 246, 399.01, 268, 333, 413.02

(56) References Cited

U.S. PATENT DOCUMENTS

| | | | |
|---|---|---|---|
| 5,302,947 A | | 4/1994 | Fuller et al. |
| 5,309,509 A | * | 5/1994 | Cocklin et al. ............. 379/165 |
| 5,323,460 A | * | 6/1994 | Warner et al. ......... 379/399.01 |
| 5,422,949 A | * | 6/1995 | Tsukagoshi ............ 379/399.01 |
| 5,870,382 A | * | 2/1999 | Tounai et al. ............... 370/220 |
| 6,018,529 A | * | 1/2000 | Toth ........................... 370/463 |
| 6,233,242 B1 | * | 5/2001 | Mayer et al. ................ 370/412 |
| 6,301,345 B1 | * | 10/2001 | Suzuki ........................ 379/156 |
| 6,381,239 B1 | * | 4/2002 | Atkinson et al. ........... 370/362 |
| 6,396,922 B1 | * | 5/2002 | Khuat .......................... 379/394 |
| 6,477,248 B1 | * | 11/2002 | Bruhnke et al. ........ 379/399.01 |
| 6,604,136 B1 | * | 8/2003 | Chang et al. ................ 709/223 |
| 6,633,639 B1 | * | 10/2003 | Ludford ....................... 379/244 |
| 6,639,983 B1 | * | 10/2003 | Kielty et al. ........... 379/399.01 |
| 6,694,015 B1 | * | 2/2004 | Byers et al. ........... 379/399.01 |

FOREIGN PATENT DOCUMENTS

| | | |
|---|---|---|
| CN | 1081778 | 2/1994 |
| JP | 63-100558 | 5/1988 |
| JP | 6-203227 | 7/1994 |

\* cited by examiner

Primary Examiner—Binh Tieu
(74) Attorney, Agent, or Firm—Katten Muchin Zavis Rosenman

(57) ABSTRACT

A common package serves as, for example, a common network interface package for a switching system. Since the common package is usable for various purposes, its cost is reduced and the cost of maintenance and management of the switching system is reduced. The common package is a printed board package (35) installed in an apparatus and used for a variety of purposes. The common package includes a programmable device (36), memories (45 to 48) for storing programs to configure the programmable device, a selector (41) for selecting one of the programs from the memory so that the selected program may so configure the programmable device as to make the common package serve as a specific circuit, and an instruction unit (51) for issuing an instruction to specify the program to be selected by the selector.

15 Claims, 14 Drawing Sheets

Fig.2A

| | VOICE data | | | | | | | |
|---|---|---|---|---|---|---|---|---|
| TS | bit1 | bit2 | bit3 | bit4 | bit5 | bit6 | bit7 | bit8 |

Fig.2B

| TS No. | TS+0 | TS+1 | TS+2 | TS+3 |
|---|---|---|---|---|
| TS0 | Housekeeping data etc. | | | |
| TS4 | SLC01-CCT00 | SLC01-CCT01 | SLC01-CCT04 | SLC01-CCT05 |
| TS8 | SLC02-CCT00 | SLC02-CCT01 | SLC02-CCT04 | SLC02-CCT05 |
| TS12 | SLC03-CCT00 | SLC03-CCT01 | SLC03-CCT04 | SLC03-CCT05 |
| TS16 | SLC04-CCT00 | SLC04-CCT01 | SLC04-CCT04 | SLC04-CCT05 |
| TS20 | SLC05-CCT00 | SLC05-CCT01 | SLC05-CCT04 | SLC05-CCT05 |
| TS24 | SLC06-CCT00 | SLC06-CCT01 | SLC06-CCT04 | SLC06-CCT05 |
| TS28 | SLC07-CCT00 | SLC07-CCT01 | SLC07-CCT04 | SLC07-CCT05 |
| TS32 | SLC08-CCT00 | SLC08-CCT01 | SLC08-CCT04 | SLC08-CCT05 |
| TS36 | SLC09-CCT00 | SLC09-CCT01 | SLC09-CCT04 | SLC09-CCT05 |
| TS40 | SLC10-CCT00 | SLC10-CCT01 | SLC10-CCT04 | SLC10-CCT05 |
| TS44 | SLC11-CCT00 | SLC11-CCT01 | SLC11-CCT04 | SLC11-CCT05 |
| TS48 | SLC12-CCT00 | SLC12-CCT01 | SLC12-CCT04 | SLC12-CCT05 |
| TS52 | SLC13-CCT00 | SLC13-CCT01 | SLC13-CCT04 | SLC13-CCT05 |
| TS56 | SLC14-CCT00 | SLC14-CCT01 | SLC14-CCT04 | SLC14-CCT05 |
| TS60 | SLC15-CCT00 | SLC15-CCT01 | SLC15-CCT04 | SLC15-CCT05 |
| TS64 | SD/SCN | | | |
| TS68 | SLC01-CCT02 | SLC01-CCT03 | SLC01-CCT06 | SLC01-CCT07 |
| TS72 | SLC02-CCT02 | SLC02-CCT03 | SLC02-CCT06 | SLC02-CCT07 |
| TS76 | SLC03-CCT02 | SLC03-CCT03 | SLC03-CCT06 | SLC03-CCT07 |
| TS80 | SLC04-CCT02 | SLC04-CCT03 | SLC04-CCT06 | SLC04-CCT07 |
| TS84 | SLC05-CCT02 | SLC05-CCT03 | SLC05-CCT06 | SLC05-CCT07 |
| TS88 | SLC06-CCT02 | SLC06-CCT03 | SLC06-CCT06 | SLC06-CCT07 |
| TS92 | SLC07-CCT02 | SLC07-CCT03 | SLC07-CCT06 | SLC07-CCT07 |
| TS96 | SLC08-CCT02 | SLC08-CCT03 | SLC08-CCT06 | SLC08-CCT07 |
| TS100 | SLC09-CCT02 | SLC09-CCT03 | SLC09-CCT06 | SLC09-CCT07 |
| TS104 | SLC10-CCT02 | SLC10-CCT03 | SLC10-CCT06 | SLC10-CCT07 |
| TS108 | SLC11-CCT02 | SLC11-CCT03 | SLC11-CCT06 | SLC11-CCT07 |
| TS112 | SLC12-CCT02 | SLC12-CCT03 | SLC12-CCT06 | SLC12-CCT07 |
| TS116 | SLC13-CCT02 | SLC13-CCT03 | SLC13-CCT06 | SLC13-CCT07 |
| TS120 | SLC14-CCT02 | SLC14-CCT03 | SLC14-CCT06 | SLC14-CCT07 |
| TS124 | SLC15-CCT02 | SLC15-CCT03 | SLC15-CCT06 | SLC15-CCT07 |

Fig.5A

SI(BWB)

| $D_3$ | $D_2$ | $D_1$ | $D_0$ |
|---|---|---|---|

Fig.5B

| $D_3$ | $D_2$ | $D_1$ | $D_0$ | CORRESPONDING PACKAGE |
|---|---|---|---|---|
| L | L | L | L | SLC |
| L | L | L | H | TRK |
| L | L | H | L | REC |
| L | L | H | H | SG |
| L | H | L | L | RESERVED |
| ⋮ | ⋮ | ⋮ | ⋮ | ⋮ |
| H | H | H | H | RESERVED |

Fig.12A

1 Multi Frame (2m Sec)

| WTS0 | WTS1 | WTS2 | WTS3 | WTS4 | ... | WTS1021 | WTS1022 | WTS1023 |

Fig.12B

| WTS No. | ZONE 0 | ZONE 1 | ZONE 2 | ZONE 3 | ZONE 4 | ZONE 5 | ZONE 6 | ZONE 7 |
|---|---|---|---|---|---|---|---|---|
| | $8n$ | $8n+1$ | $8n+2$ | $8n+3$ | $8n+4$ | $8n+5$ | $8n+6$ | $8n+7$ |

$n = 0 \sim 127$

Fig.12C

| | SDHW (SD DATA) | SCNHW (SCAN DATA) |
|---|---|---|
| ZONE 0 | DISABLED | SCN0 FOR COMMON FAILURE FOR CCT |
| ZONE 1 | SD1 TO SD4 FOR CCT | SCN1 TO SCN4 FOR CCT |
| ZONE 2 | SD1 TO SD4 FOR CCT | SCN1 TO SCN4 FOR CCT |
| ZONE 3 | SD1 TO SD4 FOR CCT | SCN1 TO SCN4 FOR CCT |
| ZONE 4 | SD1 TO SD4 FOR CCT | SCN1 TO SCN4 FOR CCT |
| ZONE 5 | UNASSIGNED | UNASSIGNED |
| ZONE 6 | FOR PWCB | FOR PWCB |
| ZONE 7 | FOR Shelf com | FOR Shelf com |

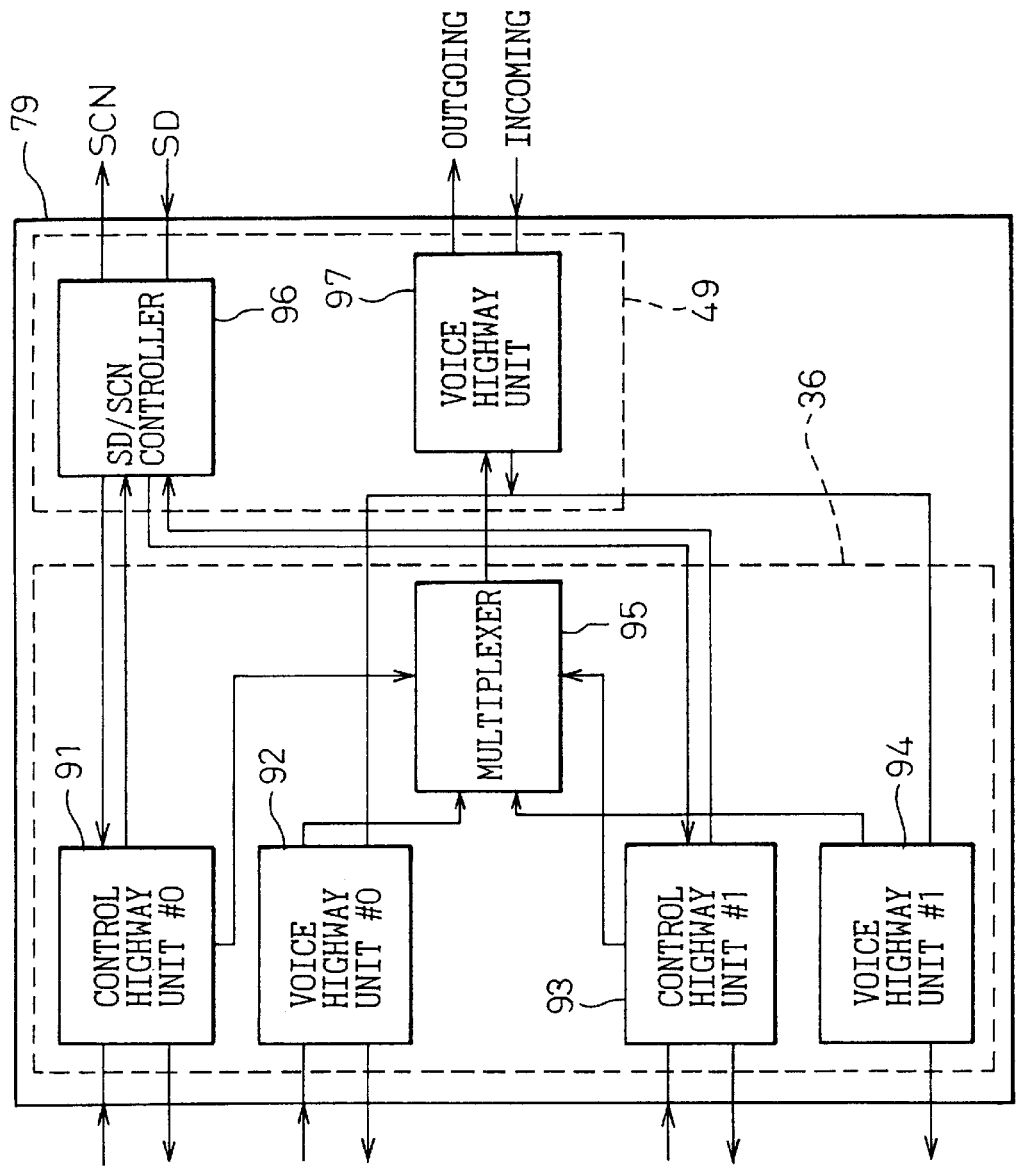

COMMON PACKAGE

BACKGROUND OF THE INVENTION

1. Field of the Invention

The present invention relates to a common package, and particularly, to a common network interface package applicable to a switching system.

2. Description of the Related Art

A switching system generally consists of four kinds of apparatuses, i.e., 1) apparatuses for making connections between subscribers, between trunks, or between subscribers and trunks, 2) channel apparatuses for receiving subscriber lines and trunk units and controlling and testing channels, 3) central processing apparatuses for analyzing data entering the switching system and issuing instructions to the channel apparatuses and I/O apparatuses, and 4) the I/O apparatuses for sending and receiving data to and from the central processing apparatuses.

FIG. 1 shows a conventional switching system.

Subscriber terminals 11 are connected to subscriber lines, which are received by subscriber circuits (SLCs) 12 of the switching system. Signals from the subscriber circuits 12 are multiplexed by subscriber concentrators (SLCCs) incorporated in a network interface (NW-INF1) 13. More precisely, the network interface 13 converts signals from subscribers into time slots in highway signals.

The highway signals are multiplexed by a network unit (NW) 14 into a higher highway signal, which is transferred to a switch (SW) 19. A line processor (LPR) 15 processes scan data (SCN) indicating the ON/OFF-hook states of subscriber terminals and signal data (SD) from higher devices. For local connections, the line processor 15 carries out switching operations within the network unit 14. The line processor 15 also controls and tests channels.

Signals from trunk circuits (TRKS) 16 are multiplexed by trunk concentrators (ATCs) incorporated in a network interface (NW-INF2) 17. More precisely, the network interface 17 converts trunk signals into time slots in highway signals, which are multiplexed by a network unit (NW) 18 into a higher highway signal. The higher highway signal is transferred to the switch 19.

According to instructions from a central processing apparatus (CC) 20, the switch 19 exchanges time slots in higher highway signals and realizes connections among the subscribers and trunks through the network units 14 and. 18. An I/O apparatus 21 sends and receives data for system management and maintenance to and from the central processing apparatus 20.

FIGS. 2A and 2B show the structures of a time slot and highway signal transferred between the network interface 13 and the network unit 14.

The time slot (TS) of FIG. 2A is for voice data and consists of eight bits, and the highway signal of FIG. 2B consists of 8-bit time slots and includes housekeeping data and SD/SCN (signal data/scan) data.

In FIG. 2B, a frame of the highway signal has a frequency of 8 KHz (a period of 125 $\mu$s) containing 128 time slots TS0 to TS127. The time slots TS0 to TS3 carry the housekeeping data containing maintenance and management data. The time slots TS64 to TS67 carry the SD/SCN data.

Each frame contains housekeeping data of 32 bits (=8 bits×4 time slots) and SD/SCN data of 32 bits. In this example, 16 frames form a multiframe having a period of 2 ms (125 $\mu$s×16), and data is updated multiframe by multiframe.

The network interfaces 13 and 17 are connected to the network units 14 and 18 and control the discrete circuits 12 and 16 arranged under the network interfaces 13 and 17. The network interfaces 13 and 17 achieve different functions, and therefore, are composed of different packages.

Each network interface has a shelf on which network interface packages are installed to control the discrete circuits such as the subscriber circuits 12 and trunk circuits 16. These packages are designed exclusively for the discrete circuits, and therefore, have the following problems:

(1) Too Many Kinds of Packages

On the one hand, the network interface packages have each a common interface with respect to the network units 14 and 18. For example, the subscriber concentrators in the network interface 13 and the trunk concentrators in the network interface 17 have each a common interface with respect to the network units 14 and 18.

On the other hand, the packages have different interfaces or LSIs optimized for the subscriber circuits 12 or trunk circuits 16. This is because back wiring boards (BWBs) arranged on the shelves of the network interfaces 13 and 17 for the packages differ from one to another depending on the circuits 12 and 16.

Recent development in multimedia communication has increased the number of discrete circuits. To cope with this, a variety of network interface packages must be prepared. This results in increasing the production, maintenance, and management costs of the packages.

(2) Problems in Highway Interfacing of Packages

A highway signal transferred between the network interface 13 (17) and the network unit 14 (18) employs a format that contains both voice data and control data such as SD/SCN. This format restricts the quantity of the control data to a minimum in the predetermined time slots as shown in FIG. 2B.

Recent development in multimedia communication has produced a variety of control data and has increased the quantity thereof, and these expanding pieces of control data are hardly handled with information provided by the predetermined time slots in the highway signal.

The conventional technique of arranging voice data and control data in the same highway signal is inefficient. For example, one must execute a program each time to monitor every frame in each multiframe of the highway signal at intervals of 125 $\mu$s to see if packages have been installed on or removed from a shelf. This deteriorates the overall efficiency of the switching system.

The control data contained in the highway signal is a mixture of different functions. Namely, pieces of the control data are disorderly arranged in the highway signal, and therefore, are inefficiently processed by a microprocessor or software for switching work. This deteriorates the overall efficiency of the switching system.

SUMMARY OF THE INVENTION

An object of the present invention is to provide a network interface package to be installed on a shelf of a network interface, having a common structure for lower circuit blocks and a general structure for a network unit, to help reduce the kinds of network interface packages and decrease the production, maintenance, and management costs thereof.

In order to accomplish the object, a first aspect of the present invention provides a common package installed in an apparatus and configurable to serve as a selected one of specific circuits. The common package consists of a programmable device, a memory for storing programs to configure the programmable device, a selector for selecting one of the programs from the memory so that the selected program may so configure the programmable device as to make the common package serve as a specific circuit, and an instruction unit for issuing an instruction to specify the program to be selected by the selector.

A second aspect of the present invention provides a common package installed in an apparatus and configurable to serve as a selected one of specific circuits. The common package consists of a programmable device to be so configured according to a program as to make the common package serve as a specific circuit, a memory for storing the program, an instruction unit for specifying the program, a notify unit for notifying the apparatus of the specified program, and a control unit for receiving the specified program from the apparatus and storing the same in the memory.

The programmable device of any one of the first and second aspects may be an FPGA (field programmable gate array). The memory of the first aspect may consist of nonvolatile memories for storing FPGA controlling programs, respectively. The memory of the second aspect may be a volatile memory.

The instruction unit issues the instruction according to self inventory data provided by a BWB (back wiring board) of the apparatus, or data provided by a manual setting unit installed on the common package. The common package is connected to discrete circuit packages.

The common package may have an interface circuit that includes lines for separately transmitting a data signal and a control signal. Data carried by the control signal is divided into zones each containing similar data.

The arrangements of the present invention may be combined in various ways.

BRIEF DESCRIPTION OF THE DRAWINGS

The present invention will be more clearly understood from the description as set forth below with reference to the accompanying drawings, in which:

FIG. 2A shows an example of a time slot handled by the system of FIG. 1;

FIG. 2B shows an example of a highway signal handled by the system of FIG. 1;

FIGS. 5A and 5B show back-wiring-board self inventory data and meanings thereof;

FIGS. 12A to 12C show an example of SD/SCN data in a highway signal according to the present invention;

FIG. 14 shows a multiplexing/demultiplexing package. according to the present invention.

DESCRIPTION OF THE PREFERRED EMBODIMENTS

Figure 3:
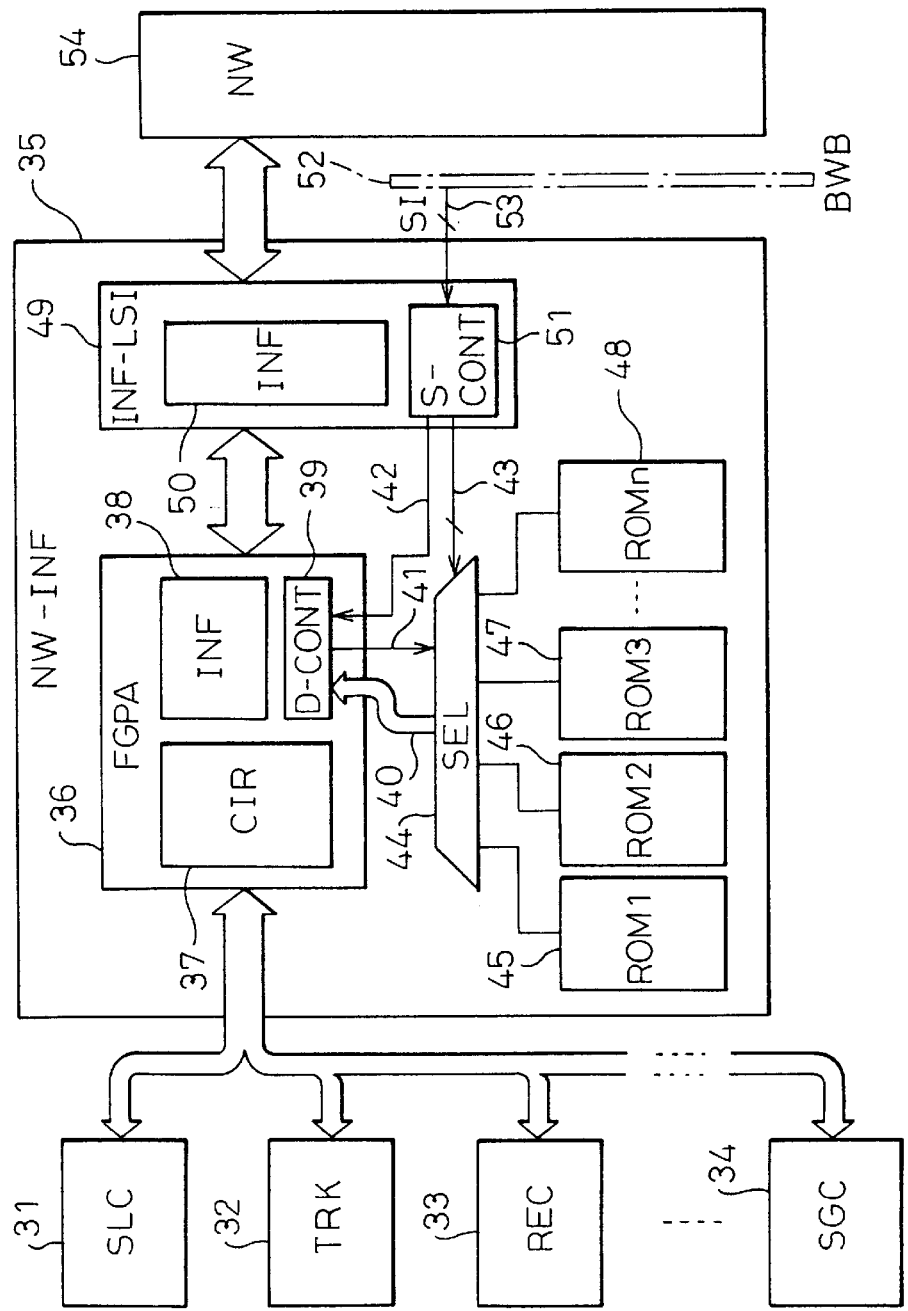
FIG. 3 shows a common network interface package according to a first embodiment of the present invention.

FIG. 3 shows a common network interface package (NW-INF) 35 according to the first embodiment of the present invention.

The common package 35 is connected to discrete circuit packages 31 to 34. The discrete circuit packages include a subscriber circuit package (SLC) 31, a trunk circuit package (TRK) 32, a receiver circuit package (REC) 33, and a signal control circuit package (SGC) 34.

The common package 35 has the following four elements:
1) Programmable Device 36

The programmable device 36 is configured so that the common package 35 may properly serve for the discrete circuit packages connected thereto. In this example, the programmable device 36 is an FPGA (field programmable gate array), which may be of a FLEX type of ALTERA (registered trade name).
2) Memory The memory stores programs to configure the FPGA 36 so that the common package 35 may properly serve for the discrete circuit packages connected thereto. In this example, the memory is composed of ROMs 45 to 48 that store programs appropriate for the discrete circuit packages connected to the common package 35.
3) Selector (SEL) 44

The selector 44 selects one of the programs from the ROMs 45 to 48 that is appropriate for the discrete circuit packages connected to the common package 35 and transfers the selected program to the FPGA 36.
4) Interface circuit The interface circuit interfaces the FPGA 36 with a network unit 54 and provides the selector 44 with a select signal to select one of the programs from the ROMs 45 to 48 according to externally provided data. In this example, the interface circuit is an exclusive interface LSI (INF-LSI) 49.

Figure 1:
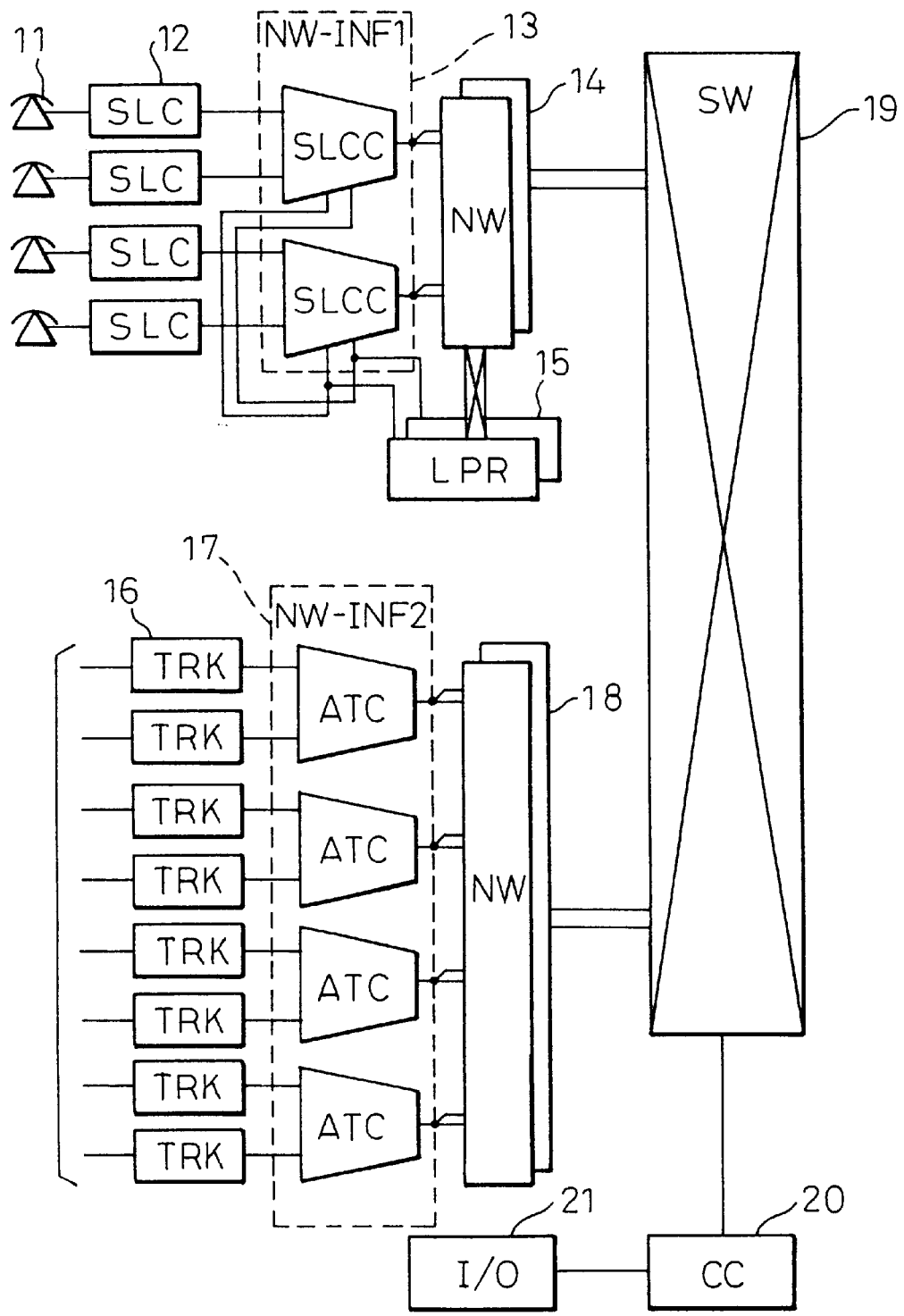
FIG. 1 shows a switching system according to a prior art.

A back wiring board (BWB) 52 provides the common package 35 with self inventory data (SI) 53, which is made of a level signal to indicate the type and version of the back wiring board 52 of a shelf on which the common package 35 is installed. The network unit 54 corresponds to the network unit 14 or 18 of FIG. 1.

The FPGA 36 consists of a configurable circuit (CIR) 37 to be configured for the discrete circuit packages controlled by the common package 35, an interface 38 interfacing with the interface LSI 49, and a download controller 39 for downloading a program from a selected one of the ROMs 45 to 48.

The interface LSI 49 consists of an interface 50 for transferring voice data and SD/SCN data to and from the network unit 54, and a selection controller 51 for decoding the self inventory data 53 from the back wiring board 52, providing a ROM select signal accordingly, and controlling the configuration of the FPGA 35.

Figure 4:
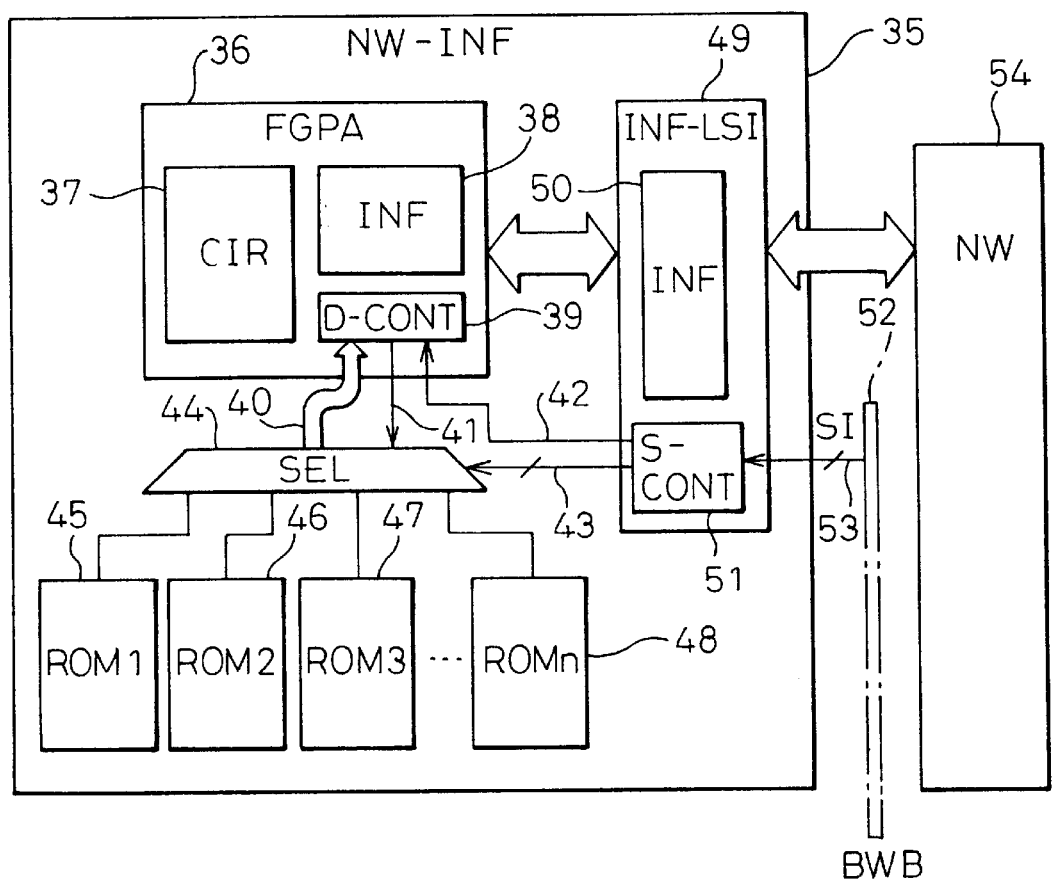
FIG. 4 shows a common network interface package according to a modification of the first embodiment.

FIG. 4 shows a common network interface package 35 according to a modification of the first embodiment. No discrete packages 31 to 34 of FIG. 3 are connected to the common package of FIG. 4. The other parts of FIG. 4 are the same as those of FIG. 3. An FPGA 36 in the common package of FIG. 4 is configured to provide a required function.

Figure 6:
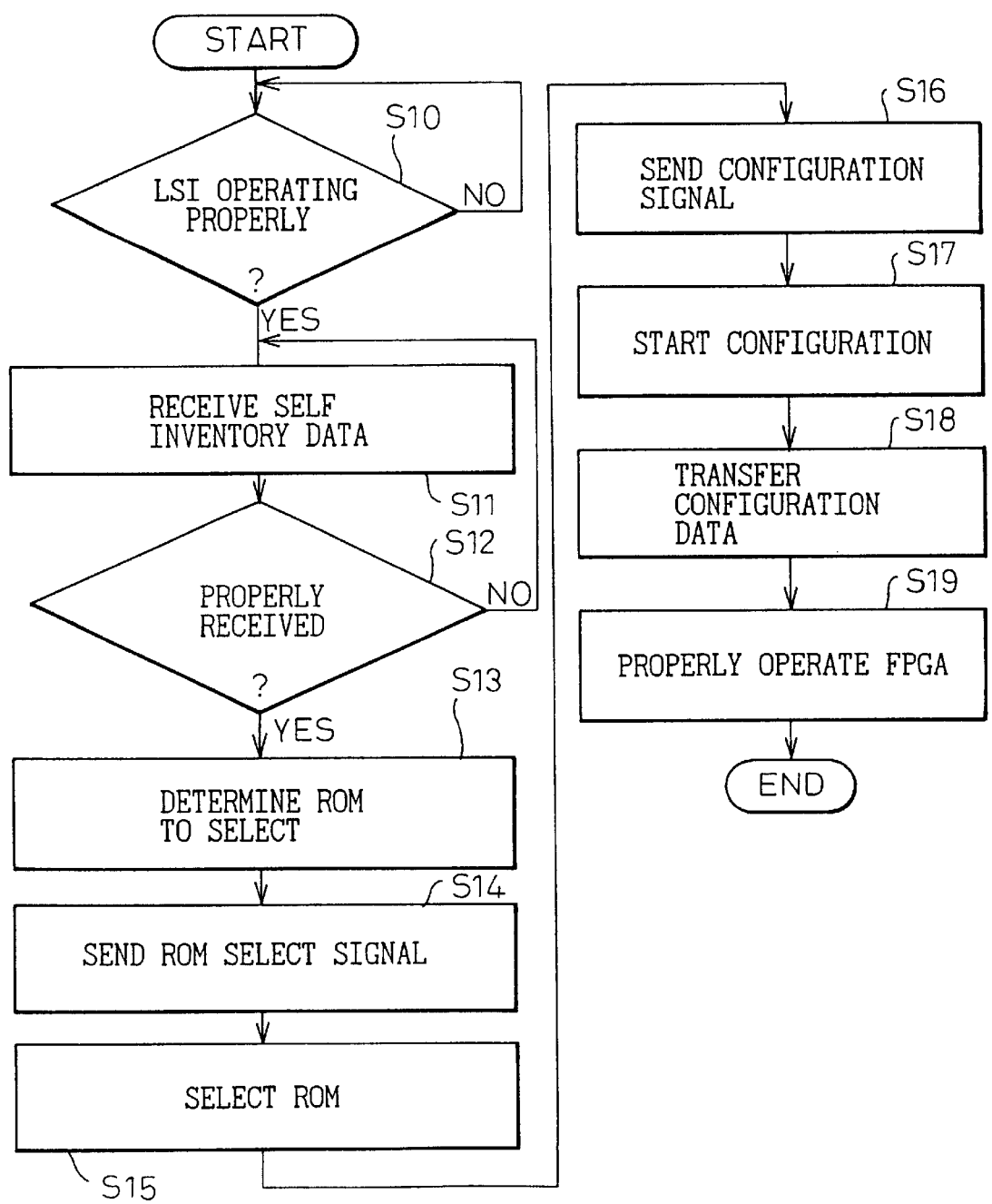
FIG. 6 is a flowchart showing an FPGA configuring flow according to the first embodiment.

FIGS. 5A and 5B show examples of the self inventory data 53 provided by the back wiring board 52. FIG. 6 shows a flow of configuring the FPGA 36 of FIG. 3.

Configuring the common package 35 for the discrete circuit packages connected thereto will be explained with reference to FIGS. 5A, 5B, and 6.

The common package 35 is installed on a shelf and is turned on. Step S10 checks to see if the interface LSI 49 is normally operating. In steps S11 and S12, the interface LSI 49 receives the self inventory data 53 from the back wiring board 52. Steps S13 and S14 determines discrete circuit packages for which the common package 35 serves according to the self inventory data 53 and provides the selector 44 with a ROM select signal 43 to select one of the ROMs 45 to 48.

FIG. 5A shows an example of the self inventory data 53. In the example, the self inventory data 53 is a 4-bit level signal made of bits D3 to D0. FIG. 5B shows examples of the meanings of combinations of the bits D3 to D0. Although discrete circuit packages including a subscriber circuit package (SLC), a trunk circuit package (TRK), and a receiver circuit package (REC) shown in FIG. 5B are represented with different levels of the bits D3 to D0, they may have the same levels in the bits D3 to D0 when they have each the same interface with respect to the common package 35.

In steps S15 and S16, the interface LSI 49 sends a ROM configuration signal 42 to the download controller 39. In steps S17 and S18, the download controller 39 sends a configuration request 41 to the selected ROM, which provides a program to configure the configurable circuit 37 and interface 38. Step S19 operates the common package 35 for the discrete circuit packages connected thereto.

In this way, the common package 35 of FIG. 3 is usable for any one of the discrete circuit packages 31 to 34 irrespective of the functions of the discrete circuit packages by selecting a proper one of the ROMs 45 to 48 according to the self inventory data 53.

Figure 7:
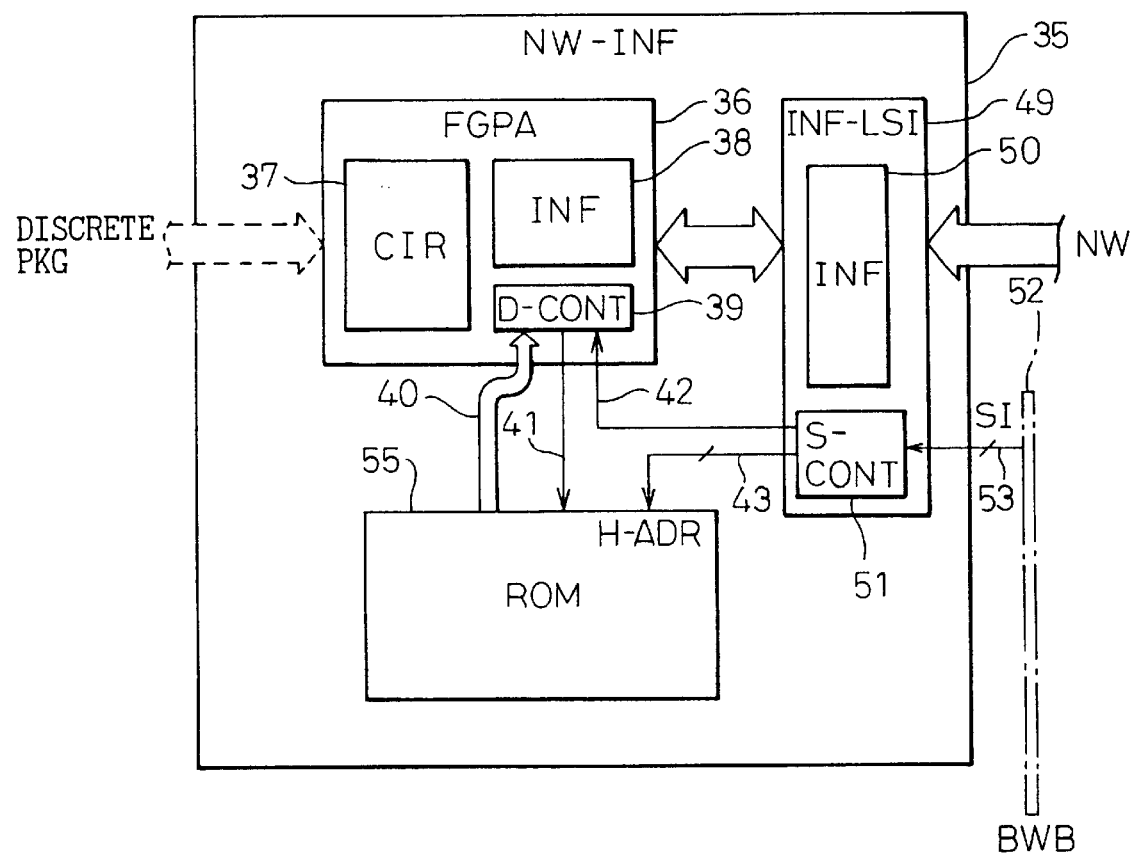
FIG. 7 shows a common network interface package according to another modification of the first embodiment.
Figure 8:
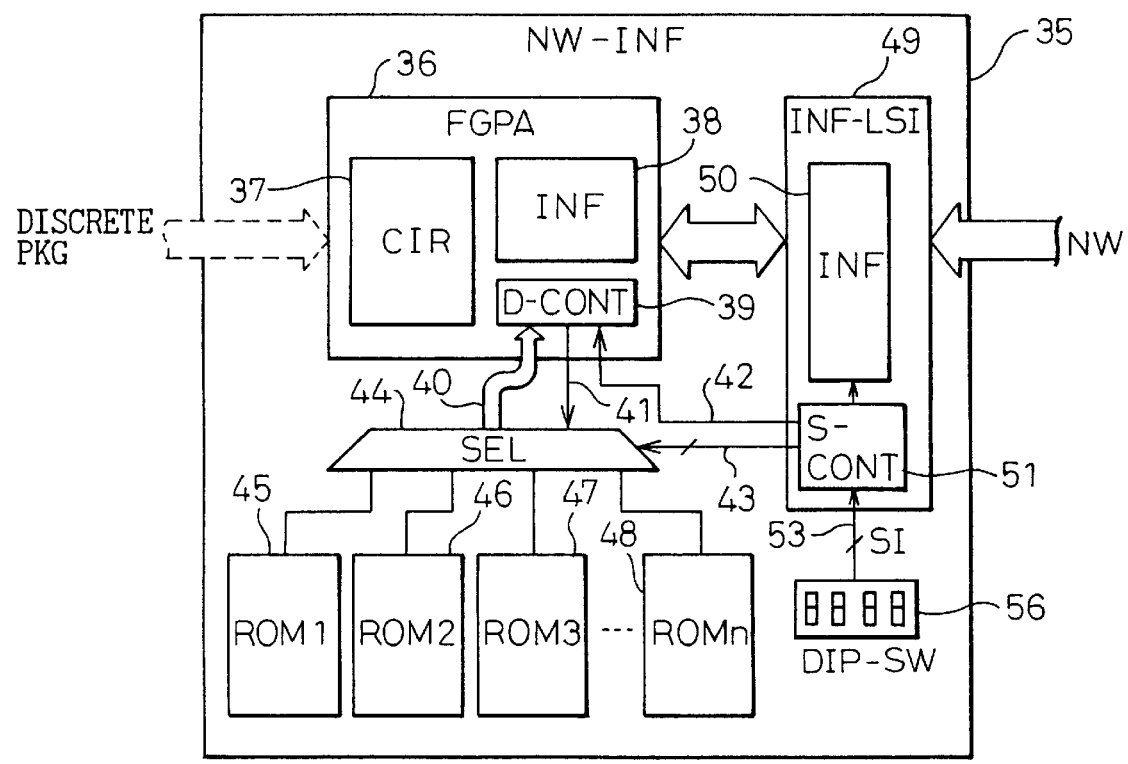
FIG. 8 shows a common network interface package according to still another modification of the first embodiment.

FIGS. 7 and 8 show common network interface packages according to modifications of the first embodiment.

In FIG. 7, the common package 35 has no selector 44 of FIG. 3 and employs only one ROM 55. A select signal from a selection controller 51 is supplied to a higher address of the ROM 55 to switch a program page to another in the ROM 55. Each program page of the ROM 55 contains a program for a discrete circuit package, and therefore, the flow of FIG. 6 is applicable to the common package 35 of FIG. 7.

In FIG. 8, the common package 35 employs no self inventory data from a back wiring board. Instead, the common package 35 has a DIP switch 56 that is manually operated to set a function for the common package 35.

Although the DIP switch 56 involves a risk of miss setting due to manual operation, the common package 35 of FIG. 8 is more versatile because it is installable on any shelf. The DIP switch 56 may also be used for an interface 50 contained in an interface LSI 49 so that the interface 50 may provide a required interface function.

Figure 9:
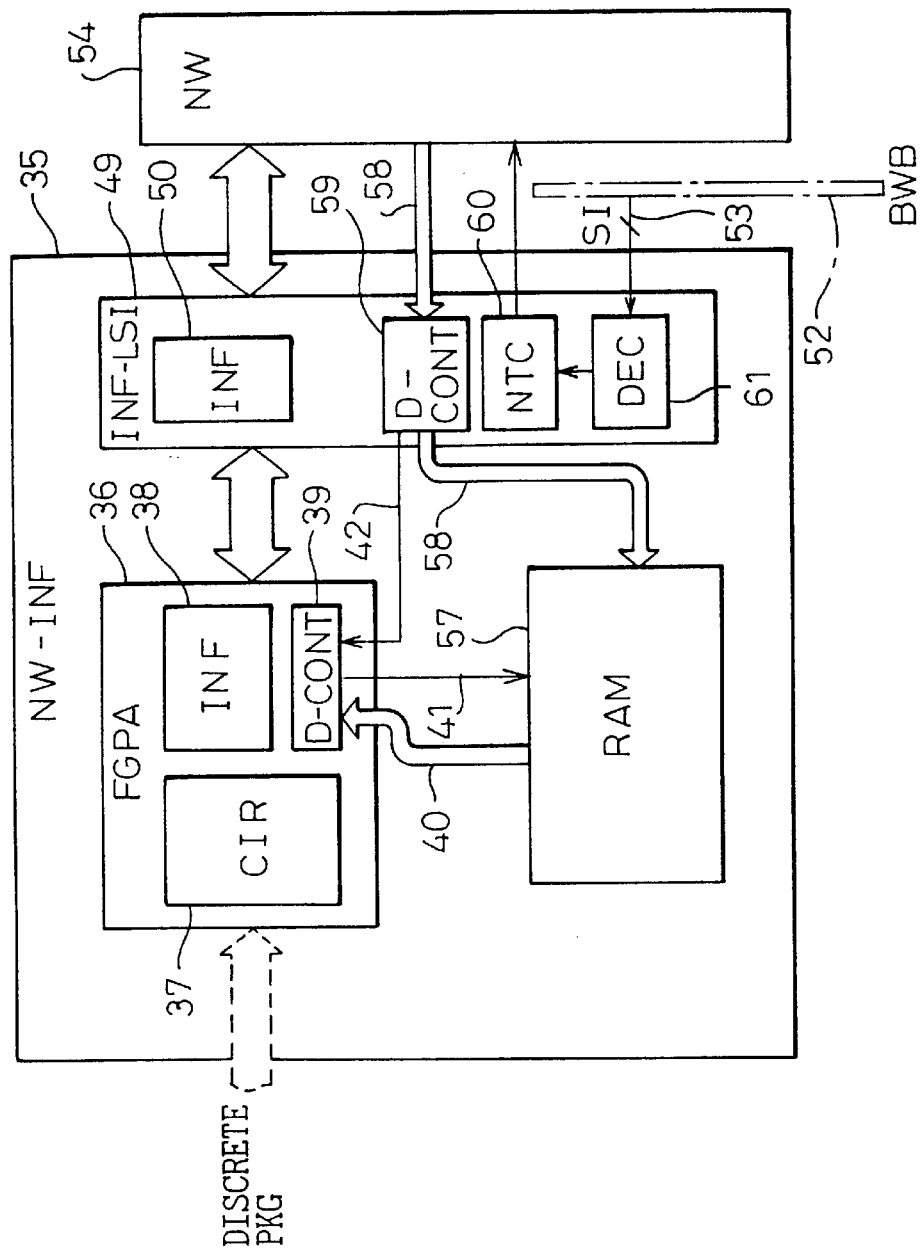
FIG. 9 shows a common network interface package according to a second embodiment of the present invention.
Figure 10:
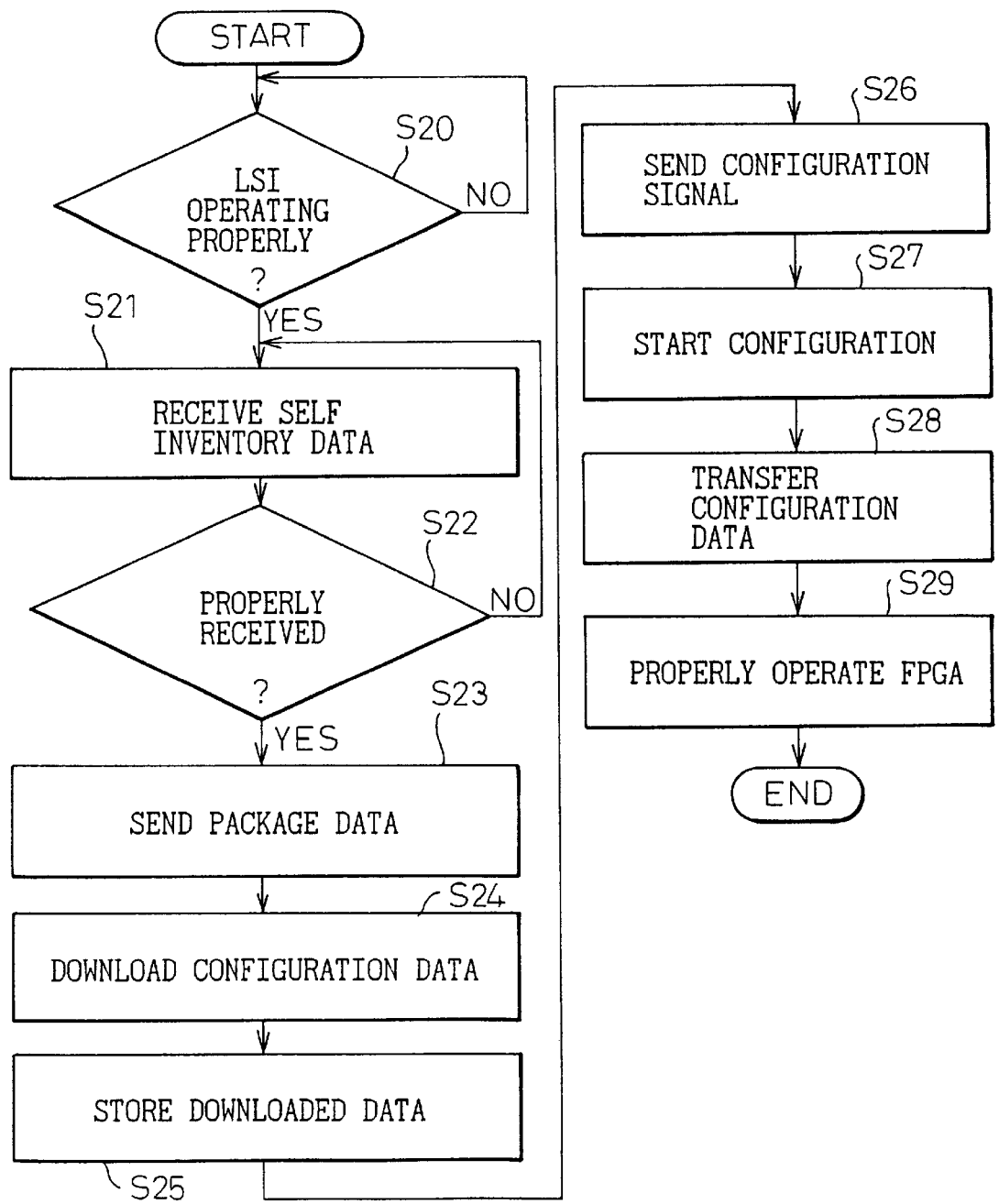
FIG. 10 is a flowchart showing an FPGA configuring flow according to the second embodiment.

FIG. 9 shows a common network interface package according to a second embodiment of the present invention, and FIG. 10 is a flowchart showing an FPGA configuring flow according to the second embodiment.

The second embodiment employs a volatile RAM 57 instead of ROMs. In steps S20 to S22, an interface LSI 49 receives self inventory data 53 from a back wiring board 52. These steps are the same as steps S10 to S12 of FIG. 6.

Step S23 determines a configuration to form according to the self inventory data 53 and notifies a higher device such as a central processing unit of the determination through a notification unit 60. In response to the notification, the higher device returns corresponding configuration data 58. In steps S24 and S25, a download controller 59 receives the configuration data and stores it in the RAM 57. The following steps S26 to S29 are the same as steps S16 to S19 of FIG. 6.

The second embodiment configures an FPGA 36 of the common package 35 according to configuration data provided by a higher device. This improves the versatility of the common package 35. In addition, the second embodiment is capable of externally updating and debugging the common package 35 and configuration data. The second embodiment may employ the DIP switch of FIG. 8.

Figure 11:
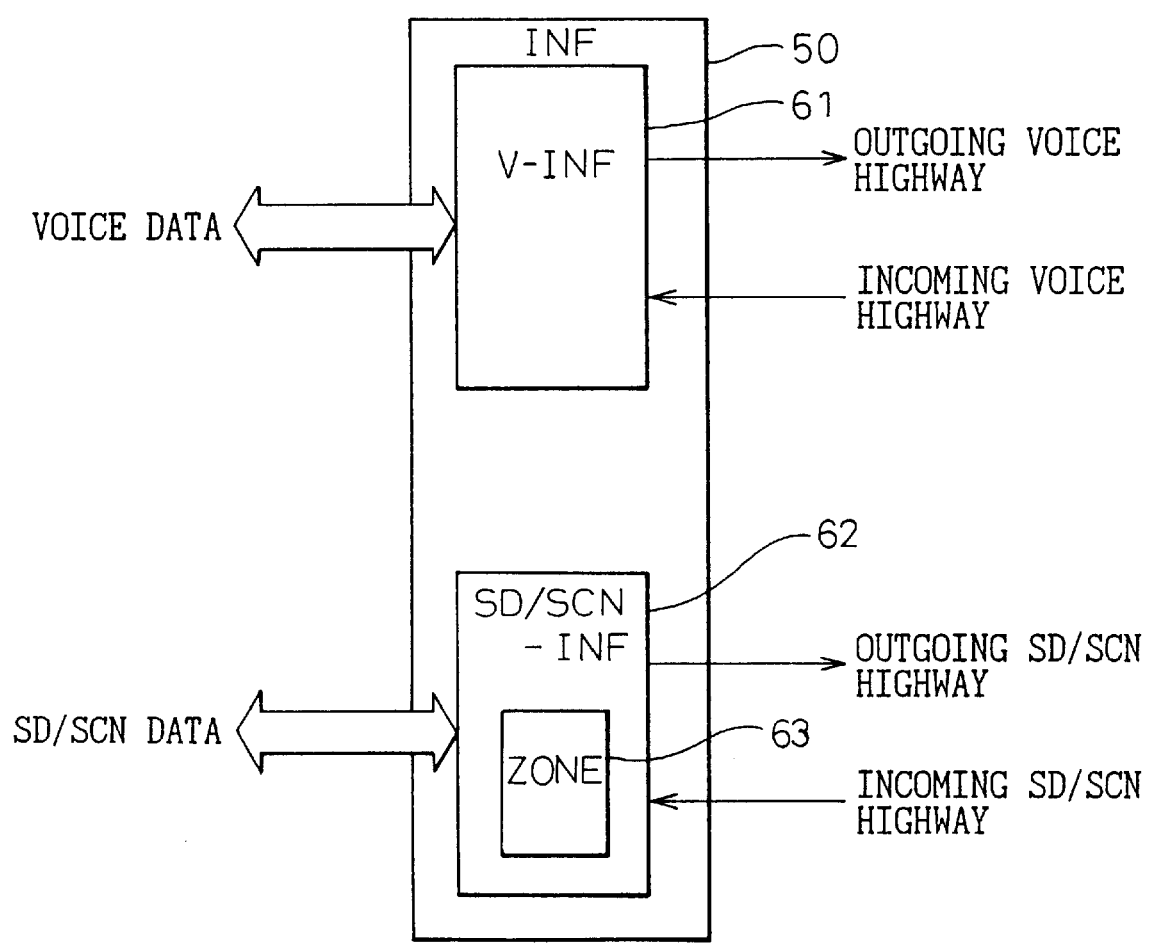
FIG. 11 shows an example of an interface circuit incorporated in the package of the present invention.

FIG. 11 shows an example of the interface 50 incorporated in the interface LSI 49 of any one of the embodiments of the present invention.

To expand the versatility of the common package 35 with respect to the network unit 54, the present invention completely divides the conventional highway structure (FIG. 2B) into voice data handled by a highway interface 61 and control data such as SD/SCN handled by a highway interface 62. This arrangement is capable of coping with a future increase in data transmission speed and data capacity.

The highway interface 62 for SD/SCN data employs a zone method. For this purpose, the highway interface 62 has a zone divider 63 to optimize data units to be processed and accessed, as shown in FIGS. 12A to 12C.

FIGS. 12A to 12C show an example of SD/SCN data in a highway signal according to the present invention.

In FIG. 12A, the present invention employs a multiframe period of 2 ms that is compatible with the prior art. Each word time slot (WTS) is composed of 32 bits to match with CPU processing. One multiframe contains 1024 time slots to secure eight times as large data transmission capacity as that of the prior art.

In FIG. 12B, eight zones 0 to 7 are cyclically assigned to a series of time slots. Each zone involves similar control data such as data about fault, or each zone is related to a given function.

The zone method has the advantages of reducing monitoring points because similar data such as fault data is collected in one zone and of improving switching performance because it is possible to shorten read intervals of significant bits or zones. For example, the monitoring of removal of packages (32 packages) can be done by collectively monitoring 32 bits in a word time slot 800. The zone method improves the versatility of control data including SD/SCN data and realizes a common interface to reduce load on firm software and improve the performance thereof.

Figure 13:
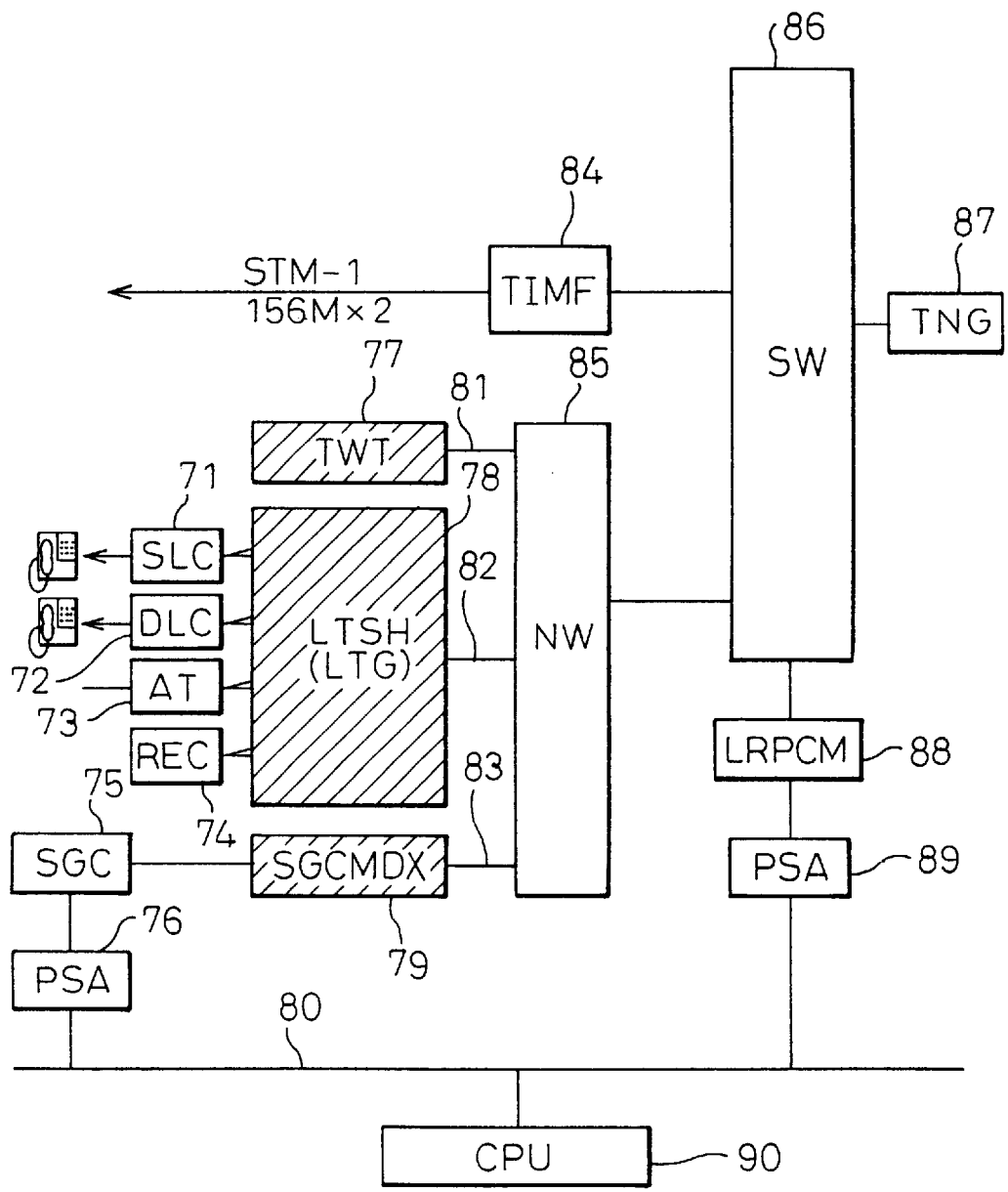
FIG. 13 shows a switching system employing the packages of the present invention.

FIG. 13 shows a switching system employing the common packages of the present invention.

The system includes an analog subscriber circuit block (SLC) 71, a digital subscriber circuit block (DLC) 72, an analog trunk circuit block (AT) 73, and a PB signal receiver circuit block (REC) 74. These circuit blocks have each a common interface on the network interface side, and therefore, are connected to a concentrator package (LTSH) 78 that is one of the common packages of the present invention.

In this embodiment, a piece of self inventory data provided by a back wiring board is made of 16 bits, and a single piece of the self inventory data is sufficient for the concentrator package 78 to control the discrete circuit packages 71 to 74 because the packages 71 to 74 have each the same interface. A three-party conversation trunk package 77, which is another one of the common packages of the present invention, has no discrete packages thereunder and is connected to a network unit 85. The package 77 corresponds to the package of FIG. 4.

A multiplexing/demultiplexing package 79, which is another one of the common packages of the present invention, is connected to a signal control package 75.

FIG. 14 shows an example of the multiplexing/demultiplexing package 79. A dotted area 36 is an FGPA, and a dotted area 49 is an interface LSI on the network side. The package 79 multiplexes voice and control highways coming from the signal control package 75 into a voice highway and an SD/SCN highway.

The other blocks of the switching system of FIG. 13 are not directly related to the present invention, and therefore, only their names will be stated. They are a digital circuit trunk 84, a highway switch 86, a tone generator 87, a path control circuit 88, bus arbiters 76 and 89, and a central processing unit 90.

The network interface packages 77 to 79 of the present invention easily recognize a shelf on which the packages are installed according to the self inventory data provided by the back wiring board. Interfaces 81 to 83 on the network unit 85 side are standardized. Accordingly, the common packages 77 to 79 that are hatched in FIG. 13 are of the type that is installable on any shelf.

In summary, the present invention provides the following effects:

The common network interface package of the present invention incorporates a programmable device so that the package is configurable for various downstream circuits. This reduces the cost of the package itself and that of a switching system that employs the common package. The present invention reduces the number of packages to be stocked and mistakes occurring when installing packages on a shelf of the switching system, thereby making the maintenance of the switching system easier.

The present invention forms a switching system with common packages of a single kind, thereby reducing designing, manufacturing, and testing processes and facilities. The common package of the present invention is capable of easily coping with an increase in the number of discrete circuit packages connected thereto.

The present invention employs the versatile signal structure that allows an increase in the number of bits in SD/SCN data and divides the data into zones each containing similar data.

The signal structure with the zone technique is applicable to the common packages and is capable of coping with the addition and removal of data bits. The zone technique is advantageous in monitoring and improving the performance of firm software.

Due to these effects, a switching system employing the present invention is functional, reliable, and inexpensive.

The present invention is applicable not only to network interface packages but also to any other packages installed in general apparatuses.

What is claimed is:

1. A common package installed in an apparatus and configurable to serve as a specific circuit package used for the apparatus, comprising:

a programmable hardware constitution device for constituting a specific hardware circuit, programmably according to hardware setting data provided thereto;

a memory for storing a plurality of programs including the respective hardware setting data;

selection means for selecting one of the programs from the memory and providing it to the programmable hardware constitution device, so that the common package can serve as a specific circuit package corresponding to the hardware setting data included in the selected program; and instruction means for issuing an instruction to specify the program to be selected by the selection means, the instruction being provided by self inventory data provided by a back wiring board of the apparatus.

2. The common package of claim 1, wherein the common package is a printed board package.

3. The common package of claim 1, wherein the programmable hardware constitution device is a field programmable gate array (FPGA).

4. The common package of claim 1, wherein the memory consists of nonvolatile memories for storing the programs, respectively.

5. The common package of claim 1, wherein the common package is connected to discrete circuit packages.

6. The common package of claim 1, further comprising:

An exclusive interface circuit for interfacing with the apparatus, having separate lines for transmitting a data signal and a control signal, respectively, control data in the control signal being divided into zones each containing similar control data.

7. The common package of claim 1, wherein the common package is a network interface package.

8. The common package of claim 6, wherein the common package is a network interface package, the data signal is a voice highway signal, and the control signal is an SD/SCN (signal data/scan) highway signal.

9. A common package installed in an apparatus and configurable to serve as a specific circuit package used for the apparatus, comprising:

a programmable hardware constitution device for constituting a specific hardware circuit, programmably according to hardware setting data provided thereto;

means for detecting an instruction to specify a program including the hardware setting data, the instruction being provided by self inventory data provided by a back wiring board of the apparatus;

means for notifying the apparatus of sending the specified program to the common package;

means for receiving the specified program from the apparatus and storing the same in a memory; and means for providing the specified program from the memory to the programmable hardware constitution device, so that the common package can serve as a specific circuit package corresponding to the hardware setting data included in the specified program.

10. The common package of claim 9, wherein the programmable hardware constitution device is a field programmable gate array (FPGA).

11. The common package of claim 9, wherein the memory is a volatile memory.

12. The common package of claim 9, wherein the common package is connected to discrete circuit packages.

13. The common package of claim 9, further comprising:

an exclusive interface circuit for interfacing with the apparatus, having separate lines for transmitting a data signal and a control signal, respectively, control data in the control signal being divided into zones each containing similar control data.

14. The common package of claim 9, wherein the common package is a network interface package.

15. The common package of claim 13, wherein the common package is a network interface package, the data signal is a voice highway signal, and the control signal is an SD/SCN (signal data/scan) highway signal.

* * * * *